United States Patent
Venkob et al.

(10) Patent No.: US 11,627,537 B2
(45) Date of Patent: *Apr. 11, 2023

(54) TIMING ADVANCE ENHANCEMENTS FOR CELLULAR COMMUNICATIONS

(71) Applicant: BlackBerry Limited, Waterloo (CA)

(72) Inventors: Satish Venkob, Waterloo (CA); David Philip Hole, Southampton (GB); Rene Faurie, Versailles (FR); Remo Borsella, Waterloo (CA); Werner Karl Kreuzer, Baiern (DE); Steven Michael Hanov, Waterloo (CA)

(73) Assignee: BlackBerry Limited, Waterloo (CA)

( * ) Notice: Subject to any disclaimer, the term of this patent is extended or adjusted under 35 U.S.C. 154(b) by 197 days.

This patent is subject to a terminal disclaimer.

(21) Appl. No.: 17/200,181

(22) Filed: Mar. 12, 2021

(65) Prior Publication Data

US 2021/0204237 A1    Jul. 1, 2021

Related U.S. Application Data

(63) Continuation of application No. 15/797,246, filed on Oct. 30, 2017, now Pat. No. 10,972,988, which is a
(Continued)

(30) Foreign Application Priority Data

Mar. 12, 2010    (EP) .................................... 10290131

(51) Int. Cl.
*H04W 56/00* (2009.01)
*H04W 74/08* (2009.01)

(52) U.S. Cl.
CPC ... *H04W 56/0005* (2013.01); *H04W 56/0045* (2013.01); *H04W 74/0833* (2013.01); *H04W 74/0866* (2013.01)

(58) Field of Classification Search
None
See application file for complete search history.

(56) References Cited

U.S. PATENT DOCUMENTS 5,818,829 A    10/1998    Raith et al.
6,633,559 B1 *  10/2003    Asokan ................ H04B 7/2656
                                                              370/335
(Continued)

FOREIGN PATENT DOCUMENTS

CA    2791858    9/2011
CN    1338192    2/2002
(Continued)

OTHER PUBLICATIONS

3rd Generation Partnership Project; Technical Specification Group Core Network and Terminals; Mobile radio interface Layer 3 specification; Core network protocols; Stage 3 (Release 9), 3GPP TS 24.008 V9.1.0, Dec. 18, 2009, 595 pages.
(Continued)

*Primary Examiner* — Faiyazkhan Ghafoerkhan
(74) *Attorney, Agent, or Firm* — Fish & Richardson P.C.

(57) ABSTRACT

A disclosed example method involves, when a device is operating in a stationary mode and before a need of the device to communicate data, determining whether a stored timing advance is valid. When the stored timing advance is not valid, a valid timing advance is determined before the need of the device to communicate the data.

18 Claims, 3 Drawing Sheets

Related U.S. Application Data continuation of application No. 15/136,104, filed on Apr. 22, 2016, now Pat. No. 9,807,715, which is a continuation of application No. 14/488,484, filed on Sep. 17, 2014, now Pat. No. 9,332,511, which is a continuation of application No. 13/045,125, filed on Mar. 10, 2011, now Pat. No. 8,867,497.

(56) References Cited

U.S. PATENT DOCUMENTS

| | | | | |
|---|---|---|---|---|
| 6,772,112 | B1* | 8/2004 | Ejzak | H04B 7/2656 |
| | | | | 704/E19.048 |
| 6,813,280 | B2 | 11/2004 | Vanttinen et al. | |
| 6,870,858 | B1 | 3/2005 | Sebire | |
| 6,963,544 | B1* | 11/2005 | Balachandran | H04B 7/2612 |
| | | | | 370/480 |
| 7,280,828 | B1* | 10/2007 | Shah | H04W 48/18 |
| | | | | 455/433 |
| 7,392,051 | B2* | 6/2008 | Rajala | H04W 36/0033 |
| | | | | 370/328 |
| 7,433,334 | B2 | 10/2008 | Marjelund et al. | |
| 7,843,895 | B2* | 11/2010 | Park | H04W 74/0833 |
| | | | | 370/328 |
| 8,085,725 | B2 | 12/2011 | Zhou | |
| 8,095,161 | B2* | 1/2012 | Sandberg | H04W 56/0045 |
| | | | | 455/67.11 |
| 8,238,895 | B2* | 8/2012 | Sorbara | H04L 12/189 |
| | | | | 455/445 |
| 8,243,667 | B2* | 8/2012 | Chun | H04W 74/0833 |
| | | | | 370/329 |
| 8,249,009 | B2 | 8/2012 | Ishii et al. | |
| 8,284,725 | B2 | 10/2012 | Ahmadi | |
| 8,363,671 | B2* | 1/2013 | Korhonen | H04W 74/006 |
| | | | | 370/437 |
| 8,498,347 | B2 | 7/2013 | Kawamura et al. | |
| 8,848,653 | B2 | 9/2014 | Edge et al. | |
| 8,867,497 | B2* | 10/2014 | Hole | H04W 56/0005 |
| | | | | 370/336 |
| 9,332,511 | B2* | 5/2016 | Hole | H04W 74/0833 |
| 9,807,715 | B2* | 10/2017 | Venkob | H04W 56/0045 |
| 10,972,988 | B2* | 4/2021 | Venkob | H04W 74/0866 |
| 2002/0071480 | A1 | 6/2002 | Marjelund et al. | |
| 2002/0080758 | A1 | 6/2002 | Landais | |
| 2002/0126630 | A1 | 9/2002 | Vanttinen et al. | |
| 2003/0002457 | A1 | 1/2003 | Womack et al. | |
| 2003/0117995 | A1 | 6/2003 | Koehn et al. | |
| 2003/0133426 | A1 | 7/2003 | Schein et al. | |
| 2004/0077248 | A1 | 4/2004 | Kurahashi et al. | |
| 2004/0077348 | A1* | 4/2004 | Sebire | H04W 36/0058 |
| | | | | 455/450 |
| 2004/0184440 | A1 | 9/2004 | Higuchi et al. | |
| 2004/0196826 | A1 | 10/2004 | Bao et al. | |
| 2004/0248575 | A1* | 12/2004 | Rajala | H04W 36/0033 |
| | | | | 455/436 |
| 2004/0264421 | A1* | 12/2004 | Sato | A61P 17/00 |
| | | | | 370/347 |
| 2005/0025095 | A1* | 2/2005 | Kim | H04W 16/26 |
| | | | | 370/347 |
| 2005/0030919 | A1 | 2/2005 | Lucidarme et al. | |
| 2005/0075112 | A1* | 4/2005 | Ball | H04W 64/00 |
| | | | | 375/132 |
| 2006/0035634 | A1 | 2/2006 | Swann et al. | |
| 2006/0072520 | A1* | 4/2006 | Chitrapu | H04B 7/2656 |
| | | | | 370/337 |
| 2006/0084443 | A1* | 4/2006 | Yeo | H04W 36/0061 |
| | | | | 455/449 |
| 2006/0164986 | A1 | 7/2006 | Rinne | H04L 47/283 |
| | | | | 370/231 |
| 2007/0021136 | A1* | 1/2007 | Allen | H04W 4/10 |
| | | | | 455/518 |
| 2007/0064665 | A1 | 3/2007 | Zhang et al. | |
| 2007/0115816 | A1 | 5/2007 | Sinivaara | |
| 2007/0136279 | A1 | 6/2007 | Zhou et al. | |
| 2007/0147326 | A1 | 6/2007 | Chen | |
| 2007/0149206 | A1* | 6/2007 | Wang | H04W 36/0085 |
| | | | | 455/450 |
| 2007/0165567 | A1* | 7/2007 | Tan | H04J 13/004 |
| | | | | 370/329 |
| 2007/0224990 | A1* | 9/2007 | Edge | H04W 8/24 |
| | | | | 455/436 |
| 2007/0254656 | A1* | 11/2007 | Dalsgaard | H04W 56/0045 |
| | | | | 455/435.1 |
| 2007/0265012 | A1* | 11/2007 | Sorbara | H04W 76/11 |
| | | | | 455/446 |
| 2007/0291696 | A1 | 12/2007 | Zhang et al. | |
| 2008/0002660 | A1* | 1/2008 | Jeong | H04L 5/023 |
| | | | | 370/350 |
| 2008/0043669 | A1* | 2/2008 | Gallagher | H04W 92/02 |
| | | | | 370/329 |
| 2008/0049708 | A1* | 2/2008 | Khan | H04B 1/713 |
| | | | | 375/E1.033 |
| 2008/0080627 | A1 | 4/2008 | Korhonen et al. | |
| 2008/0084849 | A1* | 4/2008 | Wang | H04W 36/08 |
| | | | | 370/332 |
| 2008/0107055 | A1 | 5/2008 | Sim et al. | |
| 2008/0188220 | A1 | 8/2008 | DiGirolamo et al. | |
| 2008/0225785 | A1* | 9/2008 | Wang | H04W 74/002 |
| | | | | 370/329 |
| 2008/0233992 | A1 | 9/2008 | Oteri et al. | |
| 2008/0240028 | A1* | 10/2008 | Ding | H04W 74/002 |
| | | | | 370/329 |
| 2008/0267127 | A1* | 10/2008 | Narasimha | H04W 36/0077 |
| | | | | 370/331 |
| 2008/0267131 | A1* | 10/2008 | Kangude | H04W 36/0072 |
| | | | | 370/350 |
| 2008/0273610 | A1* | 11/2008 | Malladi | H04W 74/0833 |
| | | | | 375/260 |
| 2008/0316961 | A1* | 12/2008 | Bertrand | H04W 74/04 |
| | | | | 370/329 |
| 2009/0042582 | A1* | 2/2009 | Wang | H04W 74/0866 |
| | | | | 455/450 |
| 2009/0046629 | A1* | 2/2009 | Jiang | H04J 13/0059 |
| | | | | 370/328 |
| 2009/0046676 | A1 | 2/2009 | Krishnaswamy et al. | |
| 2009/0086714 | A1* | 4/2009 | Song | H04J 3/0682 |
| | | | | 455/66.1 |
| 2009/0109908 | A1* | 4/2009 | Bertrand | H04L 5/0051 |
| | | | | 370/329 |
| 2009/0109937 | A1 | 4/2009 | Cave et al. | |
| 2009/0111445 | A1* | 4/2009 | Ratasuk | H04W 56/0045 |
| | | | | 455/418 |
| 2009/0141685 | A1 | 6/2009 | Berglund | |
| 2009/0141701 | A1* | 6/2009 | Dalsgaard | H04W 56/0045 |
| | | | | 370/350 |
| 2009/0168750 | A1* | 7/2009 | Pelletier | H04W 56/0045 |
| | | | | 370/350 |
| 2009/0197587 | A1 | 8/2009 | Frank | |
| 2009/0201868 | A1* | 8/2009 | Chun | H04W 74/0833 |
| | | | | 370/329 |
| 2009/0220017 | A1 | 9/2009 | Kawamura et al. | |
| 2009/0232107 | A1* | 9/2009 | Park | H04W 74/0833 |
| | | | | 370/336 |
| 2009/0232236 | A1 | 9/2009 | Yamamoto et al. | |
| 2009/0233615 | A1 | 9/2009 | Schmitt | |
| 2009/0239568 | A1* | 9/2009 | Bertrand | H04W 52/0225 |
| | | | | 455/522 |
| 2009/0252125 | A1* | 10/2009 | Vujcic | H04W 56/0045 |
| | | | | 370/336 |
| 2009/0305699 | A1* | 12/2009 | Deshpande | H04W 48/16 |
| | | | | 455/434 |
| 2009/0316638 | A1 | 12/2009 | Yi et al. | |
| 2009/0318175 | A1* | 12/2009 | Sandberg | H04W 56/0045 |
| | | | | 455/502 |
| 2010/0041393 | A1* | 2/2010 | Kwon | H04W 68/00 |
| | | | | 455/426.1 |
| 2010/0054235 | A1* | 3/2010 | Kwon | H04L 1/0007 |
| | | | | 370/350 |
| 2010/0074130 | A1* | 3/2010 | Bertrand | H04W 72/0473 |
| | | | | 370/252 |

(56) References Cited

U.S. PATENT DOCUMENTS

| | | | |
|---|---|---|---|
| 2010/0074246 A1* | 3/2010 | Harada | H04W 56/0045 370/350 |
| 2010/0080184 A1* | 4/2010 | Tseng | H04L 1/1854 370/329 |
| 2010/0099393 A1 | 4/2010 | Brisebois et al. | |
| 2010/0112992 A1 | 5/2010 | Stadler et al. | |
| 2010/0118816 A1 | 5/2010 | Choi et al. | |
| 2010/0120443 A1* | 5/2010 | Ren | H04W 72/0446 455/450 |
| 2010/0130220 A1* | 5/2010 | Laroia | H04W 52/0235 455/450 |
| 2010/0137013 A1* | 6/2010 | Ren | H04W 76/28 455/500 |
| 2010/0159919 A1 | 6/2010 | Wu | |
| 2010/0172299 A1* | 7/2010 | Fischer | H04W 74/0866 370/328 |
| 2010/0184420 A1* | 7/2010 | Reinhold | H04W 4/024 455/418 |
| 2010/0184445 A1* | 7/2010 | Tseng | H04W 72/21 455/450 |
| 2010/0195574 A1 | 8/2010 | Richeson et al. | |
| 2010/0202354 A1* | 8/2010 | Ho | H04L 69/22 370/328 |
| 2010/0220713 A1* | 9/2010 | Tynderfeldt | H04W 56/0045 370/350 |
| 2010/0254356 A1* | 10/2010 | Tynderfeldt | H04W 56/0045 370/336 |
| 2010/0273448 A1* | 10/2010 | Iwamura | H04W 48/08 455/406 |
| 2010/0284376 A1* | 11/2010 | Park | H04W 56/0045 370/336 |
| 2010/0330962 A1* | 12/2010 | Han | H04W 48/02 455/411 |
| 2011/0019628 A1* | 1/2011 | Tseng | H04W 72/21 370/329 |
| 2011/0038361 A1* | 2/2011 | Park | H04W 56/0005 370/350 |
| 2011/0069800 A1* | 3/2011 | Ohta | H04W 72/21 375/371 |
| 2011/0092215 A1* | 4/2011 | Back | H04W 24/02 455/448 |
| 2011/0107172 A1 | 5/2011 | Chapman et al. | |
| 2011/0128938 A1* | 6/2011 | Myers | H04L 27/233 370/331 |
| 2011/0149907 A1* | 6/2011 | Olsson | H04W 72/1215 370/328 |
| 2011/0188422 A1* | 8/2011 | Ostergaard | H04W 72/21 370/252 |
| 2011/0190011 A1* | 8/2011 | Choi | H04L 5/003 455/466 |
| 2011/0200032 A1* | 8/2011 | Lindstrom | H04W 56/0005 370/350 |
| 2011/0222475 A1* | 9/2011 | Hole | H04W 72/543 370/328 |
| 2011/0222492 A1* | 9/2011 | Borsella | H04W 74/002 370/328 |
| 2011/0223932 A1* | 9/2011 | Hole | H04W 56/0045 455/422.1 |
| 2011/0274040 A1* | 11/2011 | Pani | H04W 74/0833 370/328 |
| 2011/0287768 A1* | 11/2011 | Takamatsu | H04W 36/04 455/444 |
| 2011/0305197 A1 | 12/2011 | Park et al. | |
| 2012/0057568 A1* | 3/2012 | Lim | H04W 36/0022 370/331 |
| 2012/0129497 A1* | 5/2012 | De Benedittis | H04L 63/108 455/411 |
| 2012/0250659 A1 | 10/2012 | Sambhwani | |
| 2012/0322448 A1* | 12/2012 | Chin | H04W 36/0022 455/436 |
| 2012/0329440 A1* | 12/2012 | Chin | H04W 8/24 455/418 |
| 2015/0003430 A1* | 1/2015 | Hole | H04W 74/0866 370/336 |
| 2016/0242133 A1* | 8/2016 | Venkob | H04W 74/0833 |
| 2018/0063804 A1* | 3/2018 | Venkob | H04W 74/0866 |
| 2021/0204237 A1* | 7/2021 | Venkob | H04W 74/0833 |

FOREIGN PATENT DOCUMENTS

| | | |
|---|---|---|
| CN | 101154992 | 4/2008 |
| CN | 101162957 | 4/2008 |
| CN | 101188465 | 5/2008 |
| CN | 101330452 | 12/2008 |
| CN | 101390431 | 3/2009 |
| EP | 951192 | 10/1999 |
| EP | 0963125 | 12/1999 |
| EP | 1246399 | 10/2002 |
| EP | 1791307 | 5/2007 |
| EP | 2023548 | 2/2009 |
| EP | 2034755 | 3/2009 |
| EP | 2043391 | 4/2009 |
| EP | 2101538 | 9/2009 |
| EP | 2104339 | 9/2009 |
| EP | 2104393 | 9/2009 |
| EP | 2141938 | 1/2010 |
| EP | 2187578 | 5/2010 |
| FR | 2831009 | 4/2003 |
| GB | 2448889 | 11/2008 |
| TW | 200614735 | 8/2008 |
| TW | 201026131 | 7/2010 |
| WO | 94/05095 | 3/1994 |
| WO | 98/26625 | 6/1998 |
| WO | 00/54536 | 9/2000 |
| WO | 00/79823 | 12/2000 |
| WO | 01/11907 | 2/2001 |
| WO | 01/17283 | 3/2001 |
| WO | 01/63839 | 8/2001 |
| WO | 2005039201 | 4/2005 |
| WO | 2007109695 | 9/2007 |
| WO | 2007110483 | 10/2007 |
| WO | 2007147788 | 12/2007 |
| WO | 2008085146 | 7/2008 |
| WO | 2008097626 | 8/2008 |
| WO | 2008136488 | 11/2008 |
| WO | 2008156321 | 12/2008 |
| WO | 2009059518 | 5/2009 |
| WO | 2009072956 | 6/2009 |
| WO | 2009088160 | 7/2009 |
| WO | 2009088873 | 7/2009 |
| WO | 2009155833 | 12/2009 |

OTHER PUBLICATIONS

Panasonic: "DRX and DTX Operation in LTE_Active," 3GPP Draft; R2-060888, 3rd Generation Partnership Project (3GPP), Athens, Greece, Mar. 27-31, 2006, 3 pages.

3rd Generation Partnership Project; Technical Specification Group GSM/EDGE Radio Access Network; Mobile radio interface layer 3 specification; Radio Resource Control (RRC) protocol (Release 9), 3GPP TS 44.018 V9.3.0, Dec. 18, 2009, 428 pages.

3rd Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 9), 3GPP TS 44.060 V9.2.0, Dec. 18, 2009, 596 pages.

LG Electronics, "Uplink resource request for uplink scheduling," 3GPP Draft; R1-060922 UL Request_With TP, 3rd Generation Partnership Project (3GPP), Athens, Greece, Mar. 27-31, 2006, 4 pages.

3rd Generation Partnership Project; Technical Specification Group Services and System Aspects; Vocabulary for 3GPP Specifications (Release 9), 3GPP TR 21.905 V9.4.0, Dec. 19, 2009, 57 pages.

3rd Generation Partnership Project; Technical Specification Group GSM/EDGE Radio Access Network; Radio Subsystem Synchronization (Release 9), 3GPP TS 45.010 V9.0.0, Nov. 2009, 31 pages.

(56) References Cited

OTHER PUBLICATIONS

3rd Generation Partnership Project; Technical Specification Group GSM/EDGE Radio Access Network; Channel Coding (Release 9), 3GPP TS 45.003 V9.0.0, Dec. 2009, 321 pages.
3rd Generation Partnership Project; Technical Specification Group GSM/EDGE Radio Access Network; Multiplexing and Multiple Access on the Radio Path (Release 9), 3GPP TS 45.002 V9.2.0, Nov. 2009, 108 pages.
White Paper, "Long Term Evolution Protocol Overview," Freescale Semiconductor, Oct. 2008, 21 pages.
F. Andreasen, "Session Description Protocol (SOP) Simple Capability Declaration," Network Working Group, RFC 3407, Oct. 2002, 11 pages.
CA Office Action issued in Canadian Application No. 2,792,737 dated Apr. 24, 2014, 2 pages.
CA Notice of Allowance issued in Canadian Application No. 2,792,737 dated Dec. 8, 2014, 1 page.
CN Office Action issued in Chinese Application No. 201611114495.6 dated Jul. 1, 2019, 6 pages.
CN Office Action issued in Chinese Application No. 201611114495.6 dated Jan. 8, 2020, 2 pages.
Extended European Search Report issued in European Application No. 10290131.1 dated Sep. 3, 2010, 7 pages.
EP Communication Pursuant to Article 94(3) EPC issued in European Application No. 10290131.1 dated Nov. 20, 2012, 5 pages.
EP Communication Pursuant to Article 94(3) EPC issued in European Application No. 10290131.1 dated Nov. 26, 2015, 5 pages.
EP Communication Pursuant to Article 94(3) EPC issued in European Application No. 10290131.1 dated May 8, 2017, 5 pages.
EP Communication Pursuant to Article 94(3) EPC issued in European Application No. 10290131.1 dated Nov. 12, 2018, 9 pages.
EP Communication Pursuant to Article 94(3) EPC issued in European Application No. 10290131.1 dated Oct. 10, 2019, 8 pages.
Partial European Search Report issued in European Application No. 20190083.4 dated Oct. 29, 2020, 17 pages.
Extended European Search Report issued in European Application No. 20190083.4 dated Feb. 25, 2021, 21 pages.
IN Examiner's Report issued in Indian Application No. 7834/CHENP/2012 dated Sep. 28, 2018, 6 pages.
IN Hearing Notice issued in Indian Appliction No. 7834/CHENP/2012 on Jun. 23, 2020, 2 pages (With English Translation).
Non-Final Office Action issued in U.S. Appl. No. 15/797,246 dated Sep. 20, 2018, 45 pages.
Final Office Action issued in U.S. Appl. No. 15/797,246 dated Jan. 25, 2019, 37 pages.
Advisory Action issued in U.S. Appl. No. 15/797,246 dated Apr. 4, 2019, 3 pages.
Non-Final Office Action issued in U.S. Appl. No. 15/797,246 dated Jun. 13, 2019, 25 pages.
Final Office Action issued in U.S. Appl. No. 15/797,246 dated Dec. 3, 2019, 34 pages.
PCT International Search Report and Written Opinion in International Application No. PCT/IB2011/051006, dated Jun. 9, 2011, 11 pages.
PT International Preliminary Examining Authority Written Opinion in International Application No. PCT/IB2011/051006, dated Mar. 29, 2012, 6 pages.
PCT International Preliminary Report on Patentability in International Application No. PCT/IB2011/051006, dated Jul. 20, 2012, 8 pages.
TW Search Report for Patent Application issued in Taiwanese Application No. 100108153 dated Nov. 9, 2013, 1 page.
TW Notice of Allowance issued in Taiwanese Application No. 100108153 dated Nov. 11, 2013, 4 pages.

* cited by examiner

TIMING ADVANCE ENHANCEMENTS FOR CELLULAR COMMUNICATIONS

RELATED APPLICATIONS

This is a continuation of U.S. patent application Ser. No. 14/488,484, filed on Sep. 17, 2014, which is a continuation of U.S. patent application Ser. No. 13/045,125, filed on Mar. 10, 2011, which claims priority to European Patent Application No. 10290131.1, filed Mar. 12, 2010, all of which are hereby incorporated herein by reference in their entireties.

This application is related to U.S. Patent Applications bearing U.S. patent application Ser. No. 13/045,165, now U.S. Pat. No. 8,730,886, U.S. patent application Ser. No. 13/045,078, U.S. patent application Ser. No. 13/045,088, U.S. patent application Ser. No. 13/045,099, all of which were filed on Mar. 10, 2011, and all of which are hereby incorporated by reference herein in their entireties.

This application is related to European Patent Application Nos. 10290129.5, 10290130.3, 10290128.7, 10290132.9, 10290133.7, all of which were filed on Mar. 12, 2010, and all of which are hereby incorporated by reference herein in their entireties.

BACKGROUND

Cellular wireless communications systems such as those defined by the General Packet Radio Service (GPRS) and its successors provide communications for mobile systems (MS) (e.g., phones, computers, or other portable devices) over a service provider's core network or backbone by means of base stations (BS) connected to the core network that relay communications to and from the MS via a wireless link. The geographic area over which a particular BS is able to communicate wirelessly (i.e., via the air interface) is made up of one or more zones of radio coverage referred to as cells. In order to perform a data transfer, an MS connects to the network in a serving cell hosted by a specific BS of which it is in range. The connection may move to other cells served by the same or by a different BS when conditions warrant (e.g., a change of location as the MS moves from one cell to another) with a handover process.

A BS may provide uplink channels and/or downlink channels for multiple MS's by time division and frequency division multiplexing. In a GPRS system, for example, the BS may periodically broadcast bursts of control data on a defined broadcast control channel (BCCH) over one or more frequency channels that divide time into discrete segments called frames and contain time slots used for data transmission between the BS and an MS. The time slots of each frame on each defined frequency channel constitute the physical channels through which data transfer between an MS and a BS takes place. Logical channels, defined by the type of information they carry, may be further defined as corresponding to particular physical channels and are used to carry traffic (i.e., voice or packet data) and control data in uplink and downlink directions. The MS listens to control signals broadcast by the BS and maintains synchronization therewith in order to receive and transmit data over particular logical channels.

In order for an MS to initiate access to the network, either to initiate a data transfer or respond to a page from the BS sent over a paging channel, it may contend for medium access by transmitting an access request message to the BS on a particular channel defined for that purpose, referred to in GPRS as a random access channel (RACH). If the access request message is successfully received, the BS responds over an access grant channel and assigns downlink and/or uplink channels that are used to transfer data between the BS and MS. The assigned downlink or uplink channels constitute a virtual connection between the BS and MS that lasts for the duration of the data transfer in the cell the MS is camped, referred to as a temporary block flow (TBF).

Although the MS can maintain synchronization with downlink frames received by it from the BS, synchronization of uplink frames transmitted by the MS with the BS requires that the propagation delay be taken into account. The MS may therefore transmit its data with a specified timing offset that corresponds to the time it takes for a signal to reach the BS, referred to as the timing advance (TA). The TA is essentially a negative offset, at the MS, between the start of a received downlink frame and a transmitted uplink frame. The BS can determine the appropriate TA from the arrival times of signals transmitted by the MS with a predetermined TA (e.g., a TA value of 0 corresponding to no timing advance or some other predetermined TA value) and communicate this information to the MS.

DETAILED DESCRIPTION

Figure 1:
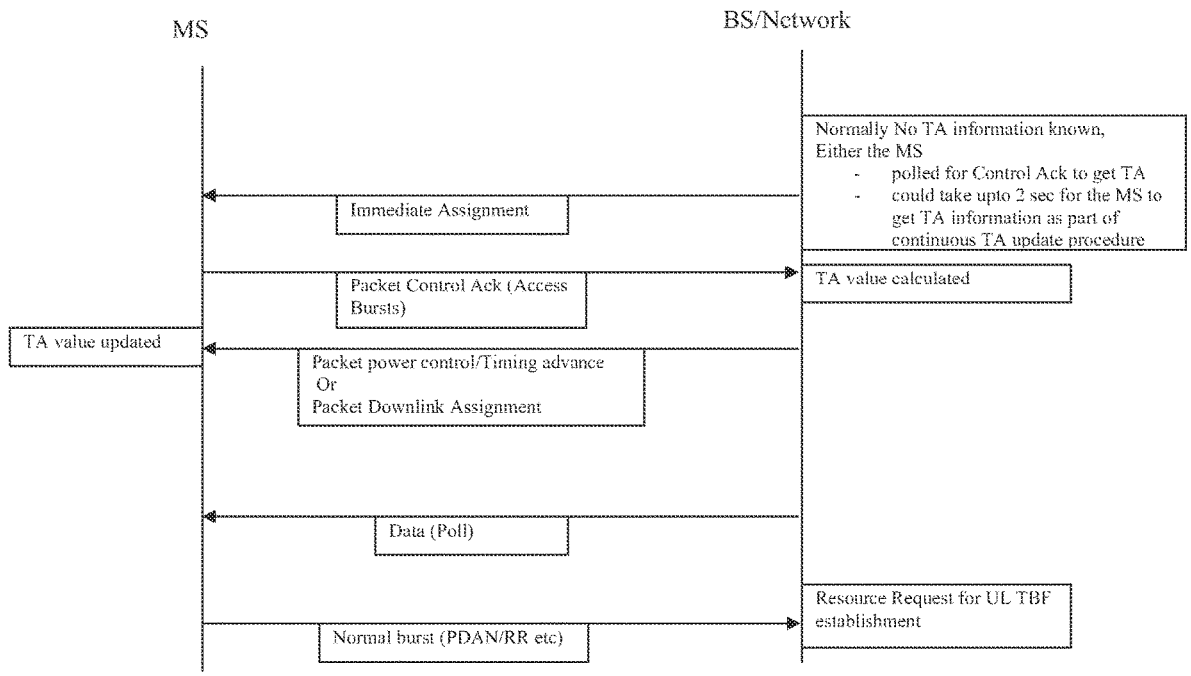
FIG. 1 illustrates a mobile-originated transfer in the moving mode.

In GPRS/EDGE systems, the RACH is a logical channel that is the uplink portion of a bidirectional common control channel (CCCH). Access to the RACH is contention-based, meaning that a device autonomously selects when to transmit on the channel and there is the possibility of collisions between transmissions from different devices. Contention-based access permits devices to trigger a request for uplink resources based on requirements rather than, for example, being scheduled periodic uplink resources which may not be used. When transmitting data to the BS, the MS may transmit the data in the form of what are referred to as normal bursts that are almost as long as a time slot. Due to the propagation time from the MS to the BS, it is necessary for an MS transmitting normal bursts to use the appropriate TA value. This appropriate TA value is not known, however, by the MS during the initial access phase when transmitting over the RACH. Therefore the current GSM/EDGE procedure requires the MS to use access bursts instead of normal bursts over the RACH. Access bursts have a guard interval that is sufficiently long to cover for the unknown propagation delay in traveling to the BS and necessarily carry less information than a normal burst. The network assigns an appropriate TA value to the MS after the initial access procedure, which can be referred to as an initial timing advance estimation procedure. The network may also update the TA value using packet timing advance control channels (PTCCH channels) based on the e.g. timing variance of the training sequence of access bursts sent on the uplink PTCCH, which can be referred to as continuous timing advance update procedures. Both procedures are an overhead signaling expense that it would be desirable to avoid if the appropriate TA value is known by the MS prior to the initial access and/or it could be assumed that this TA value has not changed.

In current GPRS/EDGE systems, the appropriate TA value for an MS is calculated by the BS and communicated to the MS upon each initial access of the network by the MS in order to take account of possible movement by the MS. The TA may also be continuously updated during a TBF by requiring the mobile station to transmit access bursts in the uplink at specific occasions and the network to estimate the timing variance of these bursts over the PTCCH or the PACCH. These current initial timing advance estimation and continuous timing advance update procedures are not efficient and may not be needed, however, for MS's that are either fixed at a certain location or whose movement is expected to be confined within a certain area. Described below are modifications to the operating behavior of the BS, MS, and/or network that reduce the extent of these TA updating procedures for such fixed MS's. The MS may be configured to operate in either a moving mode or a stationary mode, where current TA updating procedures are followed in the moving mode and modified in the stationary mode. Although the description is with reference to a GPRS/EDGE system, the modifications could be incorporated into other similar services as appropriate.

1. Fixed TA Value for Mobile-Originated (MO) Transfers in Stationary Mode

In the stationary mode, the initial timing advance procedure is not to be performed on every initial access to radio resources in a given cell as is done in the moving mode. In this context, "initial access" means the first transmission associated with the transmission of data from the MS to the network in that cell, when no other data transfer is ongoing. For example, a transmission on the RACH used as part of TBF establishment in response to receiving data from higher protocol layers for transmission is an initial access. An initial access could also occur during contention-based data transfers with no TBF being established. Rather, in the stationary mode, the MS stores the TA value received during an earlier access in the cell and uses this TA value for subsequent data transfer on that cell. In addition to performing the initial timing advance estimation procedure during initial accesses, additional triggers for doing so may also be defined such as resetting and power cycling of the device or upon receipt of a trigger signal via a specific user interface provided to permit the user to trigger the initial timing advance estimation procedure when needed. The normal initial TA estimation may also be performed if a threshold number of attempts to access resources (using a stored TA) on a cell fail. It also should be noted that modifications to the TA estimation and updating procedures described here are not intended to modify the existing procedures for maintaining or acquiring synchronization with the cell (e.g., by monitoring the appropriate synchronization channels).

Since the TA is associated with a given cell, the normal initial TA estimation procedure (RACH with access bursts, etc.) needs to be performed after cell reselection before transmitting data (i.e. any transmission other than using existing access bursts). Due to the possibility that the device moves between the time of cell reselection and data transfer, the TA is only estimated once the device is ready to start data transmission. However, for an MS operating in the stationary mode, the additional delay and signaling associated with TA determination that normally immediately precedes data transmission can be avoided by performing TA determination in advance. In addition or alternatively, a periodic TA estimation (e.g., by means of RACH with access bursts) may be performed so as to not lose synch with a given cell, for example, due to encountering changes in the channel conditions or the radio environment, or to update the TA in the case of movement by the MS. A TA estimation procedure may also be performed only if a data transfer is initiated but the last TA estimation is older than a specified time interval in order to avoid accessing the RACH just to acquire a new TA value. By having the TA available in advance of needing to transmit data, features which use knowledge of the TA when transmitting data such as using normal bursts over the RACH to transmit data or using modified access can be incorporated into the system.

2. Fixed TA Value for Mobile-Terminated (MT) Transfers in Stationary Mode

Figure 2:
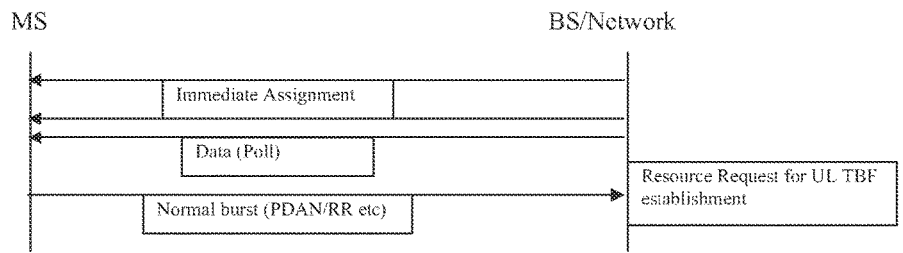
FIG. 2 illustrates a mobile-originated transfer in the stationary mode.
Figure 3:
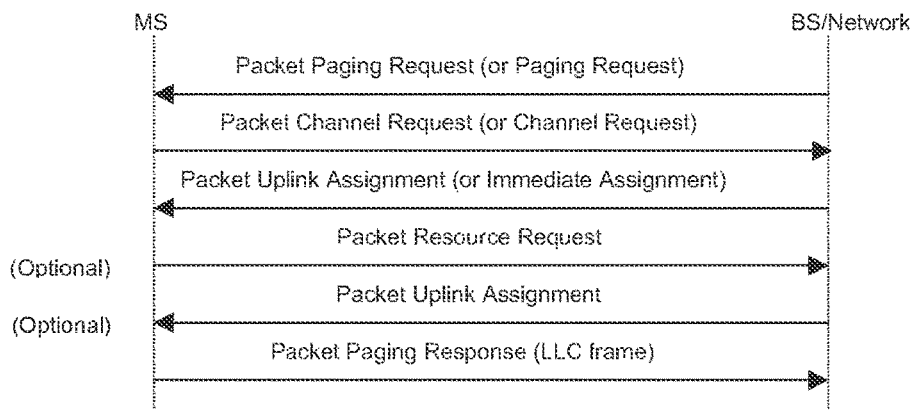
FIG. 3 illustrates a mobile-terminated transfer in the moving mode.
Figure 4:
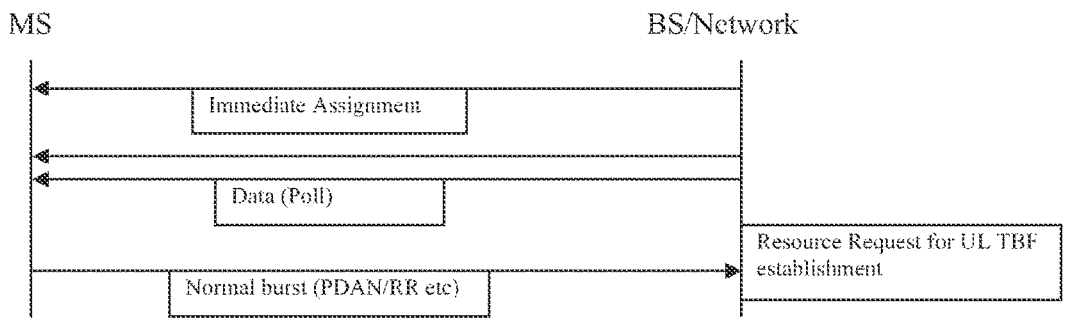
FIG. 4 illustrates a mobile-terminated transfer in the stationary mode.

In the GMM ready state, the network knows the cell in which the mobile is camped, and therefore can immediately transmit an assignment message in that cell that may immediately assign a downlink channel to the MS. FIG. 1 shows the legacy situation that also applies when the MS is operating in the moving mode. In response to the immediate assignment message, the MS transmits access bursts over the RACH to acquire a TA value and acknowledge the assignment. The MS can then request an uplink channel on which it can transmit using normal bursts with the acquired TA value. FIG. 2 shows the situation when the MS operates in the stationary mode with a stored TA value. The TA acquisition step with access bursts is skipped as the MS requests an uplink channel using normal bursts with its stored TA value. In the GMM standby state, the network only knows which routing area/location area the device is in, and hence has to page in multiple cells. FIG. 3 shows the legacy situation that also corresponds to the MS operating in the moving mode. The MS responds to a paging request by requesting a downlink channel and a valid TA value using access bursts over the RACH. FIG. 4 shows the situation when the MS operates in the stationary mode to receive an immediate assignment of a downlink channel with the page and responds with normal bursts using the stored TA to receive assignment of an uplink channel. In this case, the paging procedure may be modified to include data in the paging channel, and the response (which may acknowledge the downlink data and/or request uplink resources) is sent with normal bursts using the stored TA. Avoiding TA update signaling in these situations may reduce the time for uplink TBF establishment and/or completion of the TBF for downlink data transfer since the acknowledgement information sent by the MS cannot be transmitted until the TA is known in the legacy case.

Figure 5:
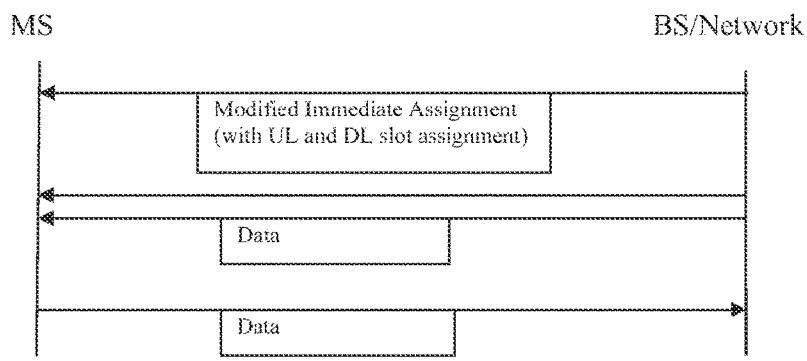
FIG. 5 illustrates a mobile-terminated transfer in the stationary mode with immediate assignment of downlink and uplink channels.

In either a ready state or standby state mobile-terminated transfer, if the network is aware that a bi-directional data transfer (e.g., by means of an uplink and downlink TBF) is required (e.g., based on knowledge that the device operates only for short data transfers which are always acknowledged by a peer entity), both an uplink and downlink channel can be assigned with an immediate assignment as shown in FIG. 5. Again, there is no need for a resource request and subsequent assignment before uplink data can be transmitted.

Since a non-mobile MS may not need to do as many cell reselections as a fully mobile MS and power constraints may not be as stringent, an MS in the stationary mode may be configured to perform a cell update procedure on cell reselections even in the standby state. This would allow the network to be always aware of the cell in which the MS is camped so that the network can use the downlink assignment procedure described above even in the standby state. As a fallback procedure the network can backup to a normal paging mechanism if the MS for any reason does not answer to the immediate assignment. Alternatively, an MS in the stationary mode may be configured to operate only in a ready state with no standby state so as to perform cell updates in the usual manner per the current GPRS/EDGE specification.

3. Reversion to Moving Mode from Stationary Mode

An MS can be configured to decide to perform the optimized procedures described above or perform procedures as currently defined if it determines that the TA value has changed from its last known value. That is, the MS may be configured to revert from the stationary mode to the moving mode if it determines that its stored TA value is probably not correct (or if it cannot determine that the stored TA value probably is correct) and that a new TA value is required. Techniques for determining a change in the correct TA value could be based upon elapsed time and/or sensor measurements indicating movement by the MS. A rough estimate of if the correct TA value has changed can be made based on the time a data transfer is initiated in relation to either the time the stored TA value was last updated or the time at which last successful data transfer occurred to validate the stored TA value. Received signal strength measurements from neighbor cells can be used as a location "fingerprint", such that if they have not changed (within some tolerance), there is high probability that the device has not moved so far that its correct TA in the serving cell is changed. An example algorithm could be performed by the MS as follows:

1. MS successfully establishes TBF (and therefore knows timing advance).
2. At end of TBF, MS stores TA plus serving cell ID plus one or more of: a) a neighbor cell list with corresponding signal strength measurements and b) a timestamp
3. When new data is to be transmitted; MS looks for serving cell ID in its stored list. If not present, MS uses normal RACH procedures. If present and time_now−timestamp<threshold and/or neighbor cell and signal measurement list are within threshold of stored list, MS uses stored TA Another technique for detecting movement by the MS could use an accelerometer to detect if the device has moved significantly enough to possibly cause the stored TA value to be invalid. For example, an MS could use an accelerometer to determine whether at least some motion has occurred or not such that if some motion is detected, then the previous TA value is considered invalid. Alternatively, accelerometer input may be used to trigger further evaluation (such as based on neighbor cell measurements, GPS, etc.) to determine whether the TA has changed. Alternatively, GPS or other satellite-based navigation may be used to determine the location of the device, both when the TA is determined and when the subsequent data transfer is to be initiated.

Besides reverting to the moving mode in order to acquire a new TA before a data transfer, the MS may perform such reversion and TA updating may be performed when it is convenient. Also, since an MS may perform cell reselection without actually moving, it may store multiple valid entries for different serving cells simultaneously.

4. Low-Rate PTCCH

Currently, the PTTCH channel is used for MSs in packet transfer mode to receive continuous timing advance updates. In the uplink, on periodic designated frames in the PTCCH (i.e. on a designated PTCCH sub-channel), the MS transmits an access burst. In response to this, the network indicates whether the TA needs to be increased or decreased. For MS's operating in the stationary mode, less frequent PTCCH sub-channel occurrences could be provided by the network that provides no TA updating when the MS in packet transfer mode is almost certain not to have moved between consecutive PTCCH sub-channel occurrences as specified by the existing standards but still allow for variations over time. A similar (but possibly occurring even less frequently) PTCCH sub-channel could be used by an MS in the stationary mode and in packet idle mode to allow the MS to validate or modify a stored TA value. This would be beneficial as it may increase the likelihood of a valid TA being available, and hence permit the use of optimized schemes such as sending data on an RACH-like channel without setting up a TBF.

5. Additional Concepts

The use of the optimized procedures using a stored TA value by an MS as described above may be made dependent on network permission (e.g., as received in broadcast system information or sent point-to-point). An MS may indicate its ability to use these procedures in its capabilities that are signaled to the network For example, the MS may indicate to the network that it is capable of operating in the stationary mode, and the network would then apply any or all of the procedures described above for a device capable of utilizing a stored TA value. In another example, such MS's may be further classified as "zero-mobility" devices whose position is fixed or as "low-mobility" devices whose maximum speed and/or range of movement is below some specified threshold value. According to this scheme, a zero-mobility device in stationary mode may operate with more of the optimized timing advance procedures as described above than a low-mobility device (which may operate in stationary mode from time to time). For example, after the MS communicates its classification to the network, the network could omit the use of existing continuous timing advance procedure for MS's indicating zero mobility but apply it, or a low-rate PTCCH optimized form of the procedure, for devices with low mobility.

If an optimized procedure with a stored TA fails such that no valid response occurs within a certain time period and/or in response to a certain number of attempts, the MS may be configured to revert to the non-stationary mode so that legacy procedures are applied. An MS may also autonomously determine that its TA value is no longer valid. In that case, if the network attempts an optimized assignment of resources, the MS may respond as per legacy paging procedures (i.e. using access bursts on RACH).

A new cause code could be used in the corresponding request message sent over the RACH to indicate this is a response to an optimized assignment. Once the MS has received a TA in response to the RACH transmissions, it may then carry on using the assigned resources.

In the embodiments described herein, a stored TA value may be determined using conventional means (e.g., as calculated by the BS) by other procedures such as, for example, using a combination of location information (e.g., GPS) combined with a cell location database (and hence calculating the distance from the device to the BS), manual configuration, or static configuration. It should also be appreciated that the stored TA value so determined may not be as accurate as that that would be obtained by convention procedures, but may be a less accurate estimation. That is, the optimized timing advance procedures described herein should be interpreted as including both cases where the TA value is exactly known (within the limits of accuracy of existing TA representation/signaling) and cases where the stored TA value is a less accurate estimate of the actual propagation delay compensation, for example, within some specified degree of error, since many of the benefits can arise even when the TA is not exactly known. For example, if the MS has no TA information at all, the bursts transmitted by the MS must be very short in order to ensure they fit within a timeslot at the BS. Even with an estimated (but not necessarily exact) TA value, however, the length of the burst can be increased (and hence more data transmitted). Said another way, the optimized timing advance procedures described herein may also apply even when the accuracy of the determined TA is not sufficient to ensure that a conventional normal burst, when transmitted using the determined TA, will be received by the BS within a single timeslot. The degree of permitted error in the TA estimation depends on the length of the burst being sent (and vice versa). In some embodiments, the length of the burst (or equivalently, the maximum permitted TA estimation error) is specified by the network. In some embodiments, the MS adapts the length of its burst in accordance with a determination of the likely accuracy of its estimated TA. (e.g., based on time since the TA was last known to be an exact value (e.g. within the accuracy of the conventional means of determining the TA), based on distance moved, or based on differences in signal strength measurements of the serving and/or neighboring cells).

Exemplary Embodiments

Figure 6:
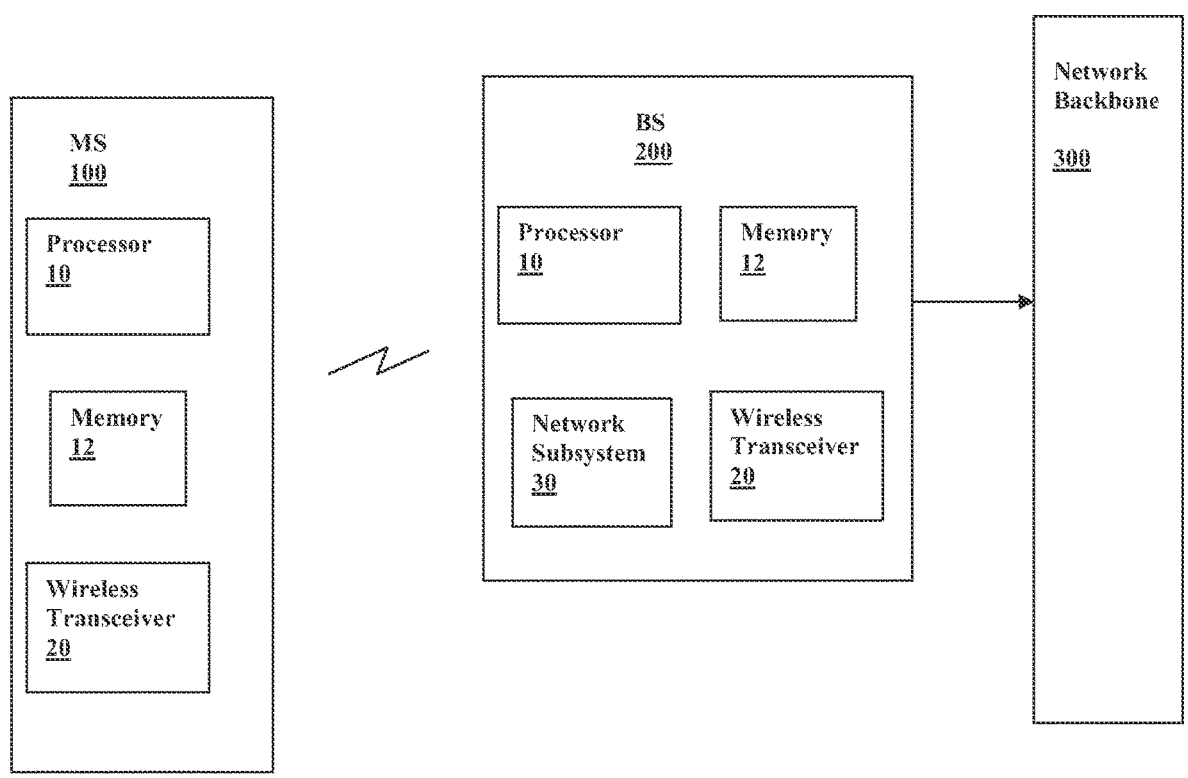
FIG. 6 shows the components of an exemplary mobile station.

FIG. 6 shows the components of an exemplary mobile station 100. A processor 10 is coupled to an associated memory 12 and controls the operation of a wireless transceiver 20 in order to communicate via the air interface with the network. An exemplary base station 200 contains similar components plus a network subsystem for communicating with the network core 300. The processor and memory may be implemented as a microprocessor-based controller with memory for data and program storage, implemented with dedicated hardware components such as ASICs (e.g., finite state machines), or implemented as a combination thereof. The MS may also be equipped with additional components such as an accelerometer or GPS unit. As the terms are used herein, a description that a particular device such as an MS or BS is to perform various functions or is configured to perform various functions refers to either code executed by a processor or to specific configurations of hardware components for performing particular functions.

The MS may comprise a processor coupled to a radio transceiver for accessing a base station (BS) via an air interface in order to communicate with the network, wherein the processor is configured to receive transmissions from the BS and synchronize therewith and further configured to transmit bursts using a specified timing advance (TA) in order to compensate for propagation delay where the specified TA value may be zero (i.e., no timing advance) or a value obtained by various means. In one embodiment, the processor is configured to operate in a stationary mode in which the bursts are transmitted using a previously stored TA value when autonomously transmitting over a random access channel (RACH) or other control channel, for example, when establishing a connection with the BS.

In another embodiment, the MS processor is configured to: 1) receive transmissions from the BS that define frames for containing time slots that may be defined as particular logical channels for carrying traffic or control information between the BS and MS in uplink or downlink directions; 2) transmit during the time slot of a particular channel using a normal burst or an access burst, the latter having a longer guard interval and shorter data field, and to transmit bursts using a specified timing advance (TA) relative to the frame in order to compensate for propagation delay; and 3) operate in either a moving mode or a stationary mode and communicate its current operating mode to the BS. In the moving mode, the MS initiates access to the network by transmitting, for example, a channel request message, to the BS using an access burst with a zero or otherwise specified TA value over a random access channel (RACH) or other control channel defined by the BS. In the case where the transmission is a channel request message, the MS receives from the BS an access grant message with a calculated TA value and assignment of one or more logical channels for further communications, stores the calculated TA value, and continues communications over the assigned channels with normal bursts using the stored TA value. In the stationary mode, the MS processor initiates access to the network by transmitting e.g. a channel request message to the BS over the RACH or other control channel using a previously stored TA value. In the case where the transmission is a channel request message, the MS receives from the BS an access grant message and assignment of one or more logical channels for further communications, and continues communications over the assigned channels with normal bursts using the stored TA value. The MS processor may also be configured to store multiple TA values for use in different cells.

The MS processor may, if in either the stationary or moving mode and after receiving an access grant message from the BS, establish a virtual connection with the BS using assigned logical channels for continuing uplink or downlink data transfer in a non-contention based manner, referred to as a temporary block flow (TBF). The MS processor may be further configured to, if in the stationary mode, transfer data to the BS using normal bursts with the stored TA in a contention based manner over an RACH or other control channel.

The MS processor may be configured to operate in the stationary mode in preference to the moving mode if a calculated TA value has been previously stored and to revert to the moving mode if a specified number of attempts to access the network in the stationary mode have failed and/or if a specified time interval has elapsed since the TA value was stored or since the last successful data transfer occurred to validate the stored TA value. The MS processor may be also be configured to: 1) periodically initiate an uplink access procedure in order to update its TA value (e.g., by sending a channel request message with a specific channel request cause or any other message that may be used or defined for obtaining an updated TA value, by initiating a cell update procedure or any procedure that would result in the provision of an updated timing advance by the network) towards the BS over an RACH or other control channel and receive an updated TA value—the period at which such uplink accesses may be initiated being either pre-defined, configured or controlled by the network, 2) if a specified time interval has elapsed since the currently stored TA value was stored, transmit a TA request message to the BS over an RACH or other control channel and receive an updated TA value, 3) switch to the moving mode for the next network access in order to receive an updated TA value upon reset or power cycling, and/or 4) switch to the moving mode for the next network access in order to receive an updated TA value upon receipt of a command from a user interface.

The MS processor may also be configured to operate in the stationary mode in preference to the moving mode if a calculated TA value has been previously stored and to revert to the moving mode upon detecting an indication that movement relative to the BS has occurred. Upon reverting to the moving mode, the MS processor may transmit a TA request message to the BS over an RACH or other control channel, receive an updated TA value, and switch to the stationary mode. Movement relative to the BS may be detected by: 1) measurements of the strength of signals transmitted by neighboring cells, 2) an accelerometer, and/or 3) a GPS unit. In one embodiment, the MS includes a GPS unit and is configured to determine its location from the GPS unit when a TA is stored and before a network access is initiated in order to determine if movement has occurred. In another embodiment, the MS includes an accelerometer and a global positioning system (GPS) unit and is configured to determine its location from the GPS unit when a TA is stored and if triggered by accelerometer signals and/or measurements of neighboring cell transmissions indicative of movement in order to determine if movement has occurred.

The MS processor may be configured to, if in the stationary mode and attached to the BS in a ready state, receive an immediate assignment of a downlink channel from the BS and transmit a request for an uplink channel using a normal burst with the stored TA value. The MS processor may be configured to, if in the stationary mode and attached to the BS in a standby state, receive a paging message with an immediate assignment of a downlink channel from the BS and transmit a request for an uplink channel using a normal burst with the stored TA value. The MS processor may be configured to, if in the stationary mode and attached to the BS, receive an immediate assignment of both downlink and uplink channels from the BS. The MS processor may be configured to, if in the stationary mode, perform periodic cell update procedures by communicating with the BS in either a ready or standby state.

In one embodiment, the MS processor is configured to, store a TA value received from the BS and the ID of the serving cell in a TA table that associates the ID with the stored TA value. If the ID of the serving cell is present in the TA table when data is be transmitted to a BS, the MS operates in the stationary mode with the associated TA value and operates in the moving mode otherwise. In another embodiment, the MS processor is configured to store a TA value received from the BS and the ID of the serving cell in a TA table that associates the ID with the stored TA value and with a timestamp that is reset with each successful data transfer. If the ID of the serving cell is present in the ID list and a specified maximum time interval has not elapsed since the associated timestamp, the MS processor then operates in the stationary mode with the associated TA value and operates in the moving mode otherwise. In another embodiment the MS processor is configured to store a TA value received from the BS and the ID of the serving cell in a TA table that associates the ID with the stored TA value and with stored signal measurements received from one or more of the serving and neighboring cells. If the ID of the serving cell is present in the TA table and if a comparison of current signal measurements from serving and/or neighboring cells with the stored signal measurements associated with the ID is a within a specified threshold when data is to be transmitted to a BS, the MS processor operates in the stationary mode with the associated TA value and operates in the moving mode otherwise.

The MS processor may be configured to, in a packet transfer mode, transmit an access burst on periodic designated frames of a packet timing advance control channel (PTCCH) and receive from the BS in response an indication as to whether the stored TA value needs to be increased or decreased, where the rate at which access bursts are transmitted over the PTCCH may be reduced for the stationary mode than for the moving mode. The MS processor may be further configured to, in the stationary mode, periodically transmit an access burst on periodic designated frames of a packet timing advance control channel (PTCCH) and receive from the BS in response an indication as to whether the stored TA value needs to be increased or decreased. The MS processor may be further configured to, if in the stationary mode and attached to the BS, revert to the moving mode for responding to an immediate assignment of downlink or uplink channels from the BS if an indication is detected that the stored TA value is no longer valid.

It should be appreciated that the various embodiments described above may also be combined in any manner considered to be advantageous. Also, many alternatives, variations, and modifications will be apparent to those of ordinary skill in the art. Other such alternatives, variations, and modifications are intended to fall within the scope of the following appended claims.

What is claimed is:

1. A method comprising:
   transmitting, from a network, an indication to a device; and
   in response to transmitting the indication, receiving, from the device, a first message indicating an initial access by the device to transmit uplink data to the network, wherein the first message comprises uplink data transmitted from the device, and the device has not performed a random access transmission associated with the initial access prior to sending the first message, wherein the first message is transmitted from the device using a valid timing advance (TA) value stored at the device, and the TA value is determined to be valid based on whether a pre-determined time interval has elapsed since the TA value was stored or since the stored TA value has been used for a last successful data transfer.

2. The method of claim 1, wherein determining that the stored TA value is valid further includes at least one of: determining whether a pre-determined number of attempts to access the network have failed using the stored TA value, or whether the device has a current location different from an original location where the stored TA value was determined for a previous data transfer.

3. The method of claim 1, wherein the device performs a random access transmission over a contention-based RACH to determine a valid TA value in response to the device determining that the TA value stored at the device is invalid.

4. The method of claim 3, wherein the device performs the random access transmission over the contention-based RACH using a zero TA value.

5. The method of claim 1, wherein the TA value stored at the device is non-zero.

6. The method of claim 1, wherein the indication is transmitted in a broadcast message.

7. A network node, comprising:
   a memory; and
   at least one hardware processor communicatively coupled with the memory and configured to:
     transmit, from the network node, an indication to a device; and
     in response to transmitting the indication, receive, from the device, a first message indicating an initial access by the device to transmit uplink data to the network node, wherein the first message comprises uplink data transmitted from the device, and the device has not performed a random access transmission associated with the initial access prior to sending the first message, wherein the first message is transmitted from the device using a valid timing advance (TA) value stored at the device, and the TA value is determined to be valid based on whether a pre-determined time interval has elapsed since the TA value was stored or since the stored TA value has been used for a last successful data transfer.

8. The network node of claim 7, wherein determining that the stored TA value is valid further includes at least one of: determining whether a pre-determined number of attempts to access the network node have failed using the stored TA value, or whether the device has a current location different from an original location where the stored TA value was determined for a previous data transfer.

9. The network node of claim 7, wherein the device performs a random access transmission over a contention-based RACH to determine a valid TA value in response to the device determining that the TA value stored at the device is invalid.

10. The network node of claim 9, wherein the device performs the random access transmission over the contention-based RACH using a zero TA value.

11. The network node of claim 7, wherein the TA value stored at the device is non-zero.

12. The network node of claim 7, wherein the indication is transmitted in a broadcast message.

13. A non-transitory computer-readable medium containing instructions which, when executed, cause a network node to perform operations comprising:
  transmitting, from the network node, an indication to a device; and
  in response to transmitting the indication, receiving, from the device, a first message indicating an initial access by the device to transmit uplink data to the network node, wherein the first message comprises uplink data transmitted from the device, and the device has not performed a random access transmission associated with the initial access prior to sending the first message, wherein the first message is transmitted from the device using a valid timing advance (TA) value stored at the device, and the TA value is determined to be valid based on whether a pre-determined time interval has elapsed since the TA value was stored or since the stored TA value has been used for a last successful data transfer.

14. The non-transitory computer-readable medium of claim 13, wherein determining that the stored TA value is valid further includes at least one of: determining whether a pre-determined number of attempts to access the network node have failed using the stored TA value, or whether the device has a current location different from an original location where the stored TA value was determined for a previous data transfer.

15. The non-transitory computer-readable medium of claim 13, wherein the device performs a random access transmission over a contention-based RACH to determine a valid TA value in response to the device determining that the TA value stored at the device is invalid.

16. The non-transitory computer-readable medium of claim 15, wherein the device performs the random access transmission over the contention-based RACH using a zero TA value.

17. The non-transitory computer-readable medium of claim 13, wherein the TA value stored at the device is non-zero.

18. The non-transitory computer-readable medium of claim 13, wherein the indication is transmitted in a broadcast message.

* * * * *